United States Patent [19]

Rizzo

[11] 3,803,699

[45] Apr. 16, 1974

[54] FLEXIBLE HOSE ASSEMBLY MEANS

[76] Inventor: Leo L. Rizzo, Rt. 1, York, Maine 03909

[22] Filed: Mar. 5, 1973

[21] Appl. No.: 337,997

[52] U.S. Cl. .............................................. 29/237
[51] Int. Cl. ............................................ B23p 19/04
[58] Field of Search .............. 29/237, 234, 235, 282

[56] References Cited
UNITED STATES PATENTS

| | | | |
|---|---|---|---|
| 3,674,292 | 7/1972 | Demler | 29/237 |
| 3,072,174 | 1/1963 | Vanderhoof | 29/237 |
| 3,662,450 | 5/1972 | Kish et al. | 29/237 |
| 3,731,518 | 5/1973 | Blocher | 29/237 |

Primary Examiner—James L. Jones, Jr.
Attorney, Agent, or Firm—R. S. Sciascia; C. E. Vautrain, Jr.

[57] ABSTRACT

A field assembly tool for joining high pressure flexible hose and assembly fittings where industrial equipment is not available is provided. Three truncated extensions attached to interconnected, adjustable, generally triangular frame members are gradually closed upon respective arcuate segments which in turn compress the hose onto a sleeve which has been inserted between the inner, sealing, and outer, structural components of the high pressure hose. A nose ring is positioned over one end of the segments and a skirt ring over the other end after which the sleeve and a mating component are joined in conventional manner.

10 Claims, 4 Drawing Figures

FLEXIBLE HOSE ASSEMBLY MEANS

The invention described herein may be manufactured and used by or for the Government of the United States of America for governmental purposes without the payment of any royalties thereon or therefor.

This invention relates to tools for assembling Teflon hose and hose fittings, and more particularly to a modification of an assembly tool which permits repair of high pressure hose and hose fittings remote from an industrial repair source.

High pressure systems having operating pressures of 5,000 psi and more often include, and may require, flexible hose portions and fittings which are difficult to maintain at these high pressures. Such systems include air, nitrogen, and other inert gases as well as helium and helium mixtures where a relatively high effusion rate can be tolerated. The flexible hoses necessary to contain these internal pressures are multilayered hoses which in one commercial form include a Teflon inner tube, a stainless steel wire braid inner reinforcement, an insulating layer, multiple layers of spirally applied stainless steel reinforcement wire, a second insulating layer, and an outer cover of stainless steel wire braid. Systems requiring such sheathed Teflon hose are normally purchased as complete units which include specified hose lengths. When hose and hose fitting replacements are required, the delays involved between an order for such replacements and receipt thereof are sometimes so prolonged that it is often necessary to attempt to fabricate replacements at the site of intended use which, in most instances, is extremely remote from the commercial source. Special tools are available for such field assemblies, however, they are extremely expensive and cumbersome. The present invention solves the foregoing problem by adapting a simple, inexpensive tool to securely apply sheathed, flexible hose to high pressure hose fittings.

The installation of high pressure flexible hose in high pressure fittings is facilitated through the present invention by securing a plurality of arcuate segments about the hose and a sleeve partially inserted between layers of the hose. A plurality of truncated arcuate extensions to radially disposed frame members apply radial pressure on respective segments through the tightening of nuts on bolts which interconnect the frame members. The arcuate extensions are gradually and successively closed upon the centrally positioned hose by successive tightening of the bolts. A nose ring and a skirt ring, which have been passed over the hose before insertion into the device, are slid into respective grooves at the ends of the segments to lock the segments together over the sleeve after which the hose and fittings thereon are removed from the device. 5 Accordingly, it is an object of this invention to provide a method of and means for securing a flexible high pressure hose preferably made of Teflon to a female fitting member without a requirement for complex and expensive machinery and tools.

Another object of the invention is to provide means for securing a flexible high pressure hose to a fitting by an easily portable and operable tool which is adapted to gradually and uniformly apply pressure radially to join fittings to the hose without deforming the hose.

A further object of the invention is to modify an existing hand tool for applying radial pressure so as to enable the ends of flexible hose to be affixed to segmented fitted members wherein the assembled members can contain internal pressures on the order of 5,000 psi and more.

Other objects, advantages and novel features of the invention will become apparent from the following detailed description thereof when considered in conjunction with the accompanying drawings in which like numerals represent like parts throughout and wherein.

Figure 1:
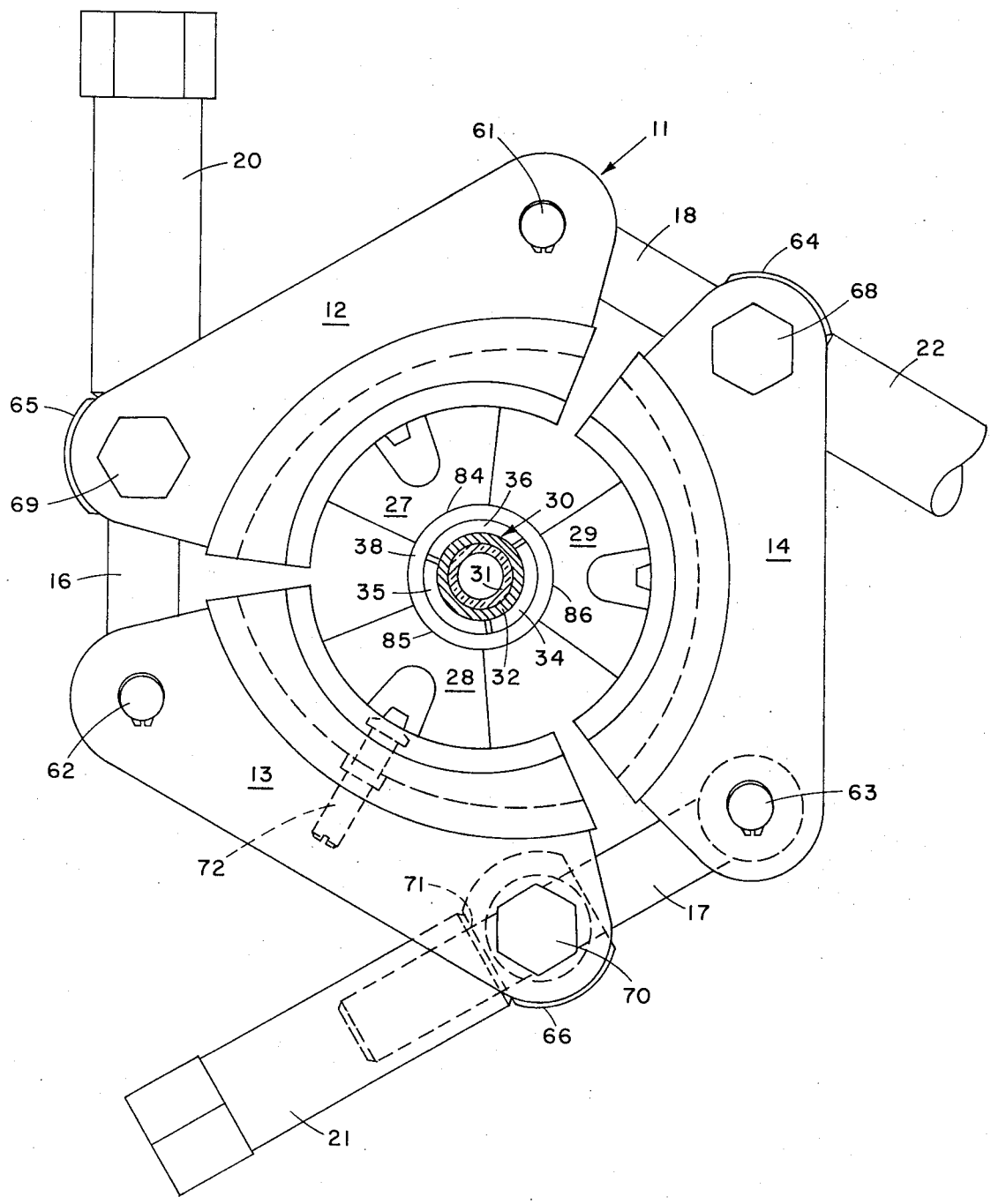
FIG. 1 is a plan view of an existing tool modified to apply high pressure fitting members to flexible hose.

Referring to FIG. 1, an assembly tool 11 is shown in which frame members 12, 13 and 14, bolts 16, 17 and 18 and handle-nuts 20 – 22 are the components of an existing assembly tool. Arcuate extensions 27, 28 and 29 to the respective frame members are components which are included in the present invention and which greatly reduce the cross-sectional area of operation of the device. Extensions 27 – 29 are secured to their respective frame members preferably by welding. Enclosed by the extensions are a flexible hose 30 comprising an inner Teflon tubing 31 and an outer sheathing 32, arcuate segments 34 – 36, and a skirt ring 38.

Figure 2:
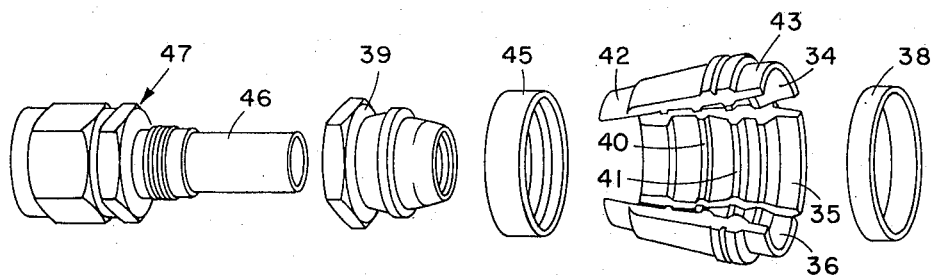
FIG. 2 is an exploded perspective view of the components to be applied to the flexible hose to form a pressure-tight fitting.

FIG. 2 is an exploded view of fittings which are applied to the flexible hose so that the hose may be joined to other pressure system components. A sleeve 39 is inserted between Teflon inner lining 31 and outer sheathing 32. The identical segments 34 – 36 are provided with internal ridges as indicated at 40 and 41 for gripping the Teflon lining and external lips 42 and 43 for receiving a nose ring 45 and skirt ring 38 when the segments have been compressed onto the outer surface of hose 30. A nipple 46 which extends from a male connection 47 to which the hose is to be joined completes the components of the pressure connection.

Figure 3:
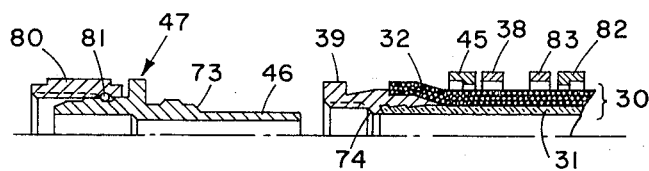
FIG. 3 is a sectional view of the pressure fitting components in unassembled relationship.
Figure 4:
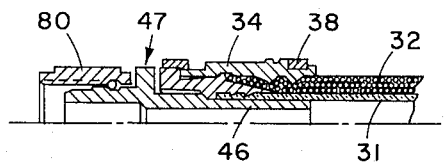
FIG. 4 is a sectional view of the pressure fitting components assembled for use.

FIG. 3 illustrates the manner in which sleeve 39 is forced between Teflon inner lining 31 and the structural outer layers of hose 32 while FIG. 4 illustrates the assembly of the components.

Referring again to FIG. 1, frame members 12 – 14 are joined together by bolts 16 – 18 which at one end are pivotally anchored at bolt pins 61, 62 and 63 and traverse bolt guides 64, 65 and 66. Bearing screws 68 – 70 are provided with planar surfaces as indicated at 71 against which handle-nuts 20–22 bear when tension is applied by turning the handles. Each frame member is provided with a locking pin as indicated at 72 for use in determining the position at which extensions 27 – 29 are secured to frames 12 – 14 and for assisting in the uniform tightening of handle-nuts 20 – 22.

In FIGS. 3 and 4, male connection 47 is secured in sealing relationship with sleeve 39 by threading the former into the latter until a metal-to-metal seat is obtained at flanges 73 and 74. A collar 80 and an O-ring 81 join the pressure fitting to the pressure system in sealed relationship.

In coupling hose 30 to a sleeve 39, nose ring 45 and skirt ring 38 as well as a second nose ring 82 and a skirt ring 83 are first passed over the hose and thereafter segments 34 – 36 are positioned about the periphery of the hose. Sleeve 39 is then forced between the Teflon inner lining and its outer structural wrappings such as stainless steel braiding and insulation layers not individually identified. Thereafter, segments 34 – 36 are positioned between frame members 12 – 14 so that outer flanges 84 – 86 of extensions 27 – 29 are opposite the respective segments intermediate flanges 42 – 43. At this time, frame members 12 – 14 are closed upon the segments by successive gradual turning of handle-nuts 20 – 22 with care being taken that the segments remain symmetrically positioned about hose 34 during tightening operations. Extensions 27 – 29 can be made of various sizes to facilitate applying segments 34 – 36 about hoses of various diameters. When sufficient pressure has been applied to compress the segments into the hose a sufficient amount to permit nose ring 45 and skirt ring 38 to be passed over the respective lips 42 and 43, the rings are slid into position and thereafter pressure on flexible hose 30 is released by backing off handle-nuts 20 – 22. The condition shown in FIG. 4 now prevails, i.e. ridges 40 – 41 have been forced into the outer coverings of hose 30 while internal ridges, not shown, in sleeve 39 have been forced into gripping engagement with Teflon lining 31 of flexible hose 30. The nose and skirt rings lock the segments into place about the hose so that the assembly connections may now be made by simply threading male connection 47 into sleeve 39 until a metal-to-metal seat is established.

It will be appreciated that the present invention provides a tool for replacing the flexible hose in flexible hose assemblies which ordinarily are purchased as complete units and include selected lengths of hoses. Without the present invention, it is necessary to fabricate a replacement assembly through the use of a special tool which costs substantially 100 times the amount of the modified tool. The invention provides the further advantage of permitting fabricating in remote areas with a minimum of equipment and in a matter of a few hours. When viewed against the usual 60 to 90 days delay involved in obtaining factory replacements, the overall savings of the invention can be realized.

The present modification is applicable to virtually any flexible hose sizes. The modification is to a tool which most field units would have available for assembling standard sizes of much lower pressure hoses. The extensions which are welded to the frame members of the conventional apparatus may be cut from ½ inch steel plate. Hose lengths in the pressure assemblies may be extended or shortened as desired, again without having to be sent back to the commercial source or factory. Pressure fittings assembled according to the present invention have been tested up to 15,000 psi with excellent sealing observed.

Obviously many modifications and variations of the present invention are possible in the light of the above teachings.

What is claimed is:

1. In combination with an assembly tool for the field assembly of large segmented hose fittings and rubber hose, said tool having frame members which are adapted to exert radial pressure on hoses and hose fittings, the improvement thereof which comprises:
   means secured to the bearing surfaces of said frame members to form interior arcuate bearing surfaces of substantially diminished diameters,
   a flexible cable and a composite fitting therefor,
      said composite fitting including a sleeve for insertion into said cable, a plurality of arcuate segments to be pressed against the outer surface of said cable, and locking rings for retaining said segments in compression against said cable,
      said interior arcuate bearing surfaces adapted to mate with the exterior surfaces of said arcuate segments, whereby said arcuate segments may be pressed against and into said cable by operation of said assembly tool until said locking rings may be positioned about said segments.

2. The device as defined in claim 1 wherein said means are sectors of a flange having a central opening of the same radius as the exterior radius of said arcuate segments.

3. The device as defined in claim 2 wherein said arcuate segments are equal in number to said frame members and are secured thereto in symmetrical alignment.

4. The device as defined in claim 3 wherein said flexible hose is a high pressure hose having an inner lining made of poly (tetra fluoro ethylene) reinforced externally by wire braid,
   said sleeve being inserted between said inner lining and said external wire braid,
   said sleeve having ridges for gripping said inner lining and said segments having ridges for gripping said wire braid so as to form a fitting capable of withstanding pressure on the order of 5,000 psi and more.

5. The improvement to an assembly tool for exerting radial pressure and which includes three generally triangular frame members having opposed arcuate bearing surfaces that are adapted to be drawn together by handles turned over threaded rods comprising:
   an extension member symmetrically attached to each of said frame members at the opposing interior surfaces thereof,
      said extension members having arcuate opposing inner surfaces adapted to conform individually to the segments of a flexible fitting; and
   a flexible cable and a fitting therefor which includes a sleeve for insertion into said cable, a trio of arcuate segments to be pressed against the outer surface thereof, and locking rings for holding said segments in place,
      whereby said segments may first be positioned against a flexible hose disposed between said extension members and thereafter said frame members may be successively drawn together until said locking rings may be positioned about said segments.

6. The device as defined in claim 5 wherein said extension members are sectors of a flange having a central opening of the same radius as the exterior radius of said arcuate segments and whose circumference has the same radius as that of said arcuate bearing surfaces.

7. The device as defined in claim 6 wherein said sectors individually subtend an arc of substantially 70° from the center of said assembly tool to provide a substantial area of contact with said frame members and said arcuate segments.

8. The device as defined in claim 7 wherein said extension members are cut away centrally along their periphery to accommodate fittings of said assembly tool and are welded to said frame members,
   said flexible cable being a high pressure flexible hose having a lining made of poly (tetra fluoro ethylene)

and a sheath made of alternate layers of insulation and steel braiding.

9. The device as defined in claim 8 wherein said extension members are formed from ½ inch steel plate to provide the structural strength required from stock material.

10. The device as defined in claim 9 wherein the width of said sectors is varied to permit a plurality of extension members of different sizes to be secured alternately to a single assembly tool so that a variety of sizes of high pressure flexible hose may be secured in fittings therewith.

* * * * *